March 23, 1937.　　　　H. CASLER　　　　2,074,890
PHOTOGRAPHIC PACK
Filed Nov. 22, 1935　　　2 Sheets-Sheet 1
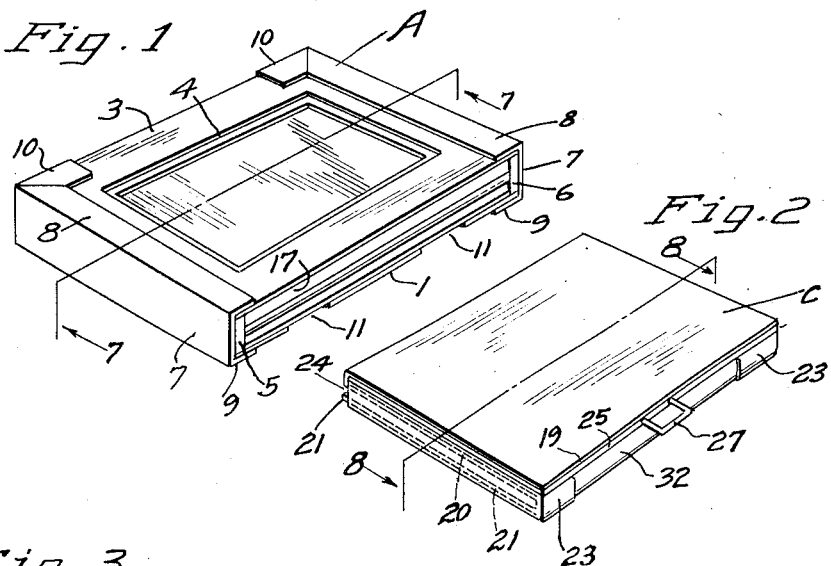
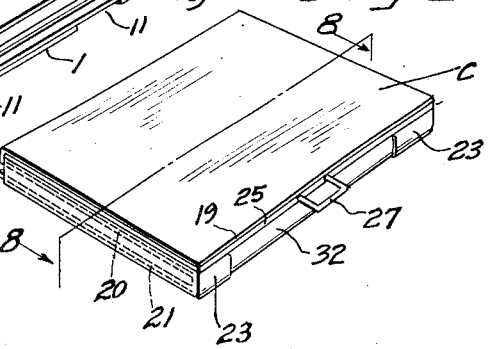
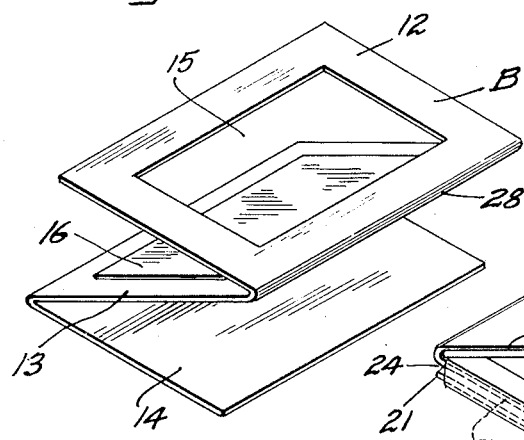
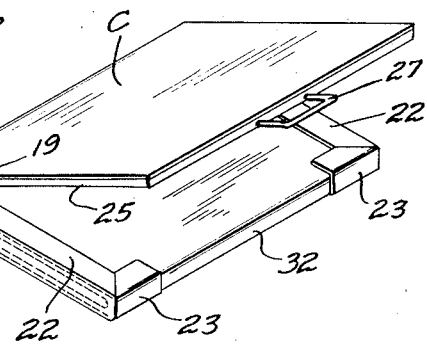
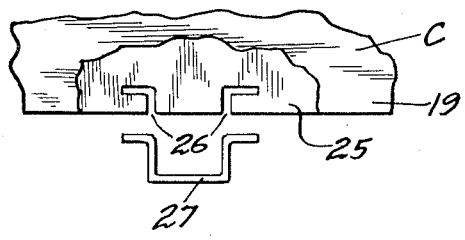
Inventor
H. CASLER
By Robb & Robb
Attorneys March 23, 1937. H. CASLER 2,074,890
PHOTOGRAPHIC PACK
Filed Nov. 22, 1935 2 Sheets-Sheet 2
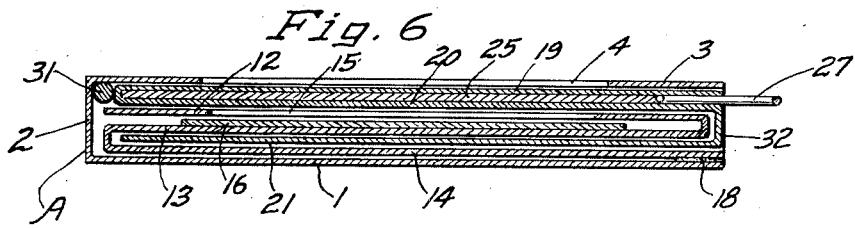
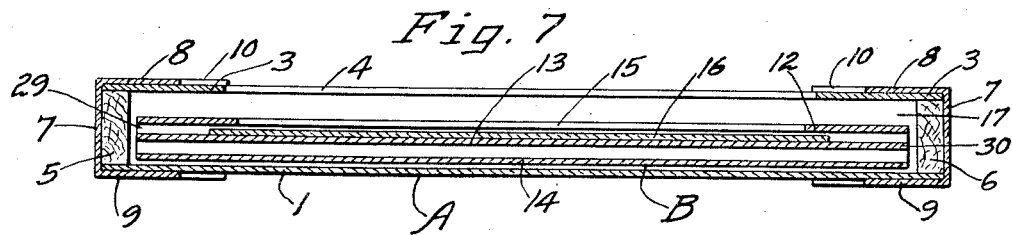
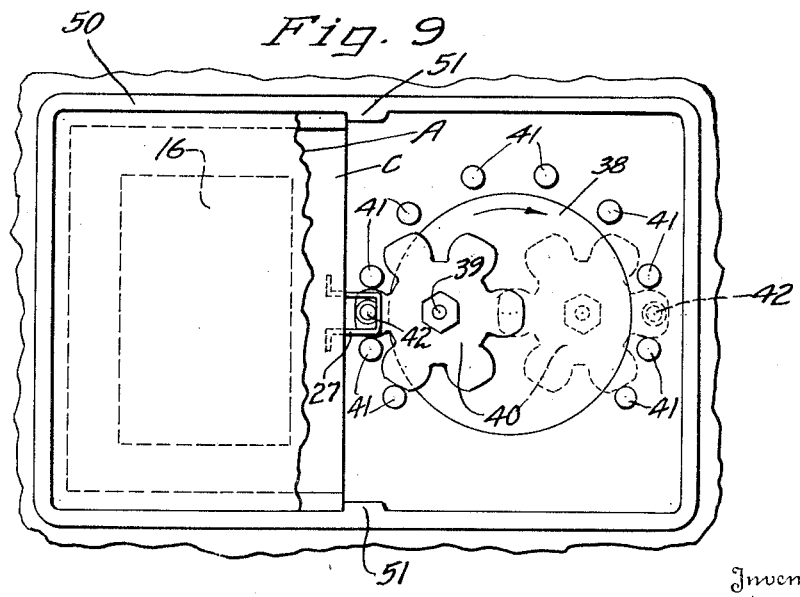
Inventor
H. CASLER
By Robert Cobb
Attorneys Patented Mar. 23, 1937

2,074,890

UNITED STATES PATENT OFFICE 2,074,890

PHOTOGRAPHIC PACK

Herman Casler, Canastota, N. Y.

Application November 22, 1935, Serial No. 51,164

18 Claims. (Cl. 95—72)

This invention appertains to improvements in holders for photographic films, plates, or other light-sensitive elements, and more particularly to a film or picture pack for photographic apparatus. The present application may be said to be a continuation in part of my pending application Serial No. 12,644, filed March 23, 1935, wherein the pack is generally disclosed in association with my new method and apparatus for treating photographic pictures.

One of the primary objects of the invention is to provide a pack or holder which may be conveniently handled from the time of its purchase until the picture has been completely developed, without requiring that such handling and developing treatments be performed in a so-called "dark room" or under special light-excluding conditions. In other words, my improved pack or holder is of the daylight loading and unloading type, whereby the same may be loaded in a camera, removed therefrom after exposure of the light-sensitive surface to record an image of the subject, and developed, all in the daylight. The developing operation is preferably carried out through means of my improved daylight developer apparatus which is the subject of my copending application previously referred to.

A further object of the invention is to provide a simple and inexpensive film or picture pack of unitary form, preferably such that it may be loaded as a unit into a camera having suitable provision for receiving the same, and after exposure of the film, plate, or other photosensitive element, removed from the camera and transferred as a unit to suitable developing apparatus such as forms the subject of my previous application. That is to say, the holder or pack unit has such a form that it may be utilized in both the exposure or recording stage, as well as in the developing stage.

Another object of the invention is to provide a film or picture pack which is composed of a holding frame or envelope, having an opening in one side, and being open at one edge to receive a light-sensitive element on which the image or picture is to be recorded, the light-sensitive element registering with the opening in the side of the frame or envelope when so received by the envelope, together with shutter means also receivable within the frame or envelope and movable therein so as to selectively cover or expose the light-sensitive element, as desired.

A still further object of the invention is to provide a simple and inexpensive holder of novel construction, having an improved shutter means of envelope-like form adapted to coact with the plate, film, or other light-sensitive element, whereby to selectively mask or expose the light-sensitive element, suitable provision being made for adjusting the position of the shutter so that the light-sensitive element may be masked or exposed at will.

Other and further objects and advantages will be hereinafter described, and the novel features thereof defined by the appended claims.

In the drawings:

Figure 1 is a perspective view showing my improved holder frame or casing with the film, plate, or other light-sensitive element mounted therein;

Figure 2 is a perspective view of my improved shutter means which is adapted to be received by the casing of Figure 1, the shutter means being of envelope-like form to receive the light-sensitive element when fully inserted within the frame, and thus mask the light-sensitive element;

Figure 3 is a perspective view of a carrier having a suitable light-sensitive element applied thereto, the carrier being illustrated in a partly unfolded condition to better disclose the details thereof;

Figure 4 is a perspective view of the shutter, a part thereof being shown in a separated condition to better illustrate the details of the shutter;

Figure 5 is an enlarged fragmentary detail view illustrating the manner of assembling the shutter-adjusting tongue or tab;

Figure 6 is a sectional view through the pack unit with the shutter disposed in masking relation to the light-sensitive element, the section being taken approximately on a plane passing from front to rear of the unit and approximately midway between the ends of the unit, the front being considered the open side of the unit through which the shutter is inserted;

Figure 7 is a sectional view taken approximately on the line 7—7 of Figure 1;

Figure 8 is a sectional view taken approximately on the line 8—8 of Figure 2; and Figure 9 is a view illustrating the manner in which the pack unit is adapted to be received within a camera or developer apparatus, together with one form of convenient means for manipulating or adjusting the position of the shutter means.

Like reference characters designate corresponding parts in the several figures of the drawings.

My improved pack is composed of an outer casing or envelope A, which is closed on three sides and on the bottom, but open at its front side so as to receive a plate, film, or other light-sensitive element, preferably mounted on a carrier, generally designated B. The top side of the casing is formed with an opening therein for purposes which will hereinafter become more apparent. A shutter or slide, generally designated C, is provided so as to be slidably receivable within the casing in such a manner that it is capable of being moved so as to mask the light-sensitive element, or expose the same, as may be desired.

*Outer casing or envelope*

Referring particularly to Figures 1, 6 and 7, the casing or envelope A is preferably constructed from relatively heavy black paper, such as is available for photographic work, although it is to be understood that I do not wish to be limited to the use of this material, as other materials may be substituted therefor. The material is preferably opaque and flexible or pliable, so that the casing or envelope can be easily formed therefrom, as by folding the same to provide a bottom 1, a back side 2 and a top side 3. The top side 3 is provided with an opening 4 of a size approximately the size of the picture which is to be recorded on the light-sensitive element. As illustrated, the opening 4 is substantially rectangular, although it may be given other configurations, as may be desired. In other words, the size of the envelope or casing A and the opening 4 may be varied to suit the particular needs, and it is contemplated that these packs may be made up in various sizes so as to afford the purchaser a choice in respect to the size of the light-sensitive element to be used.

Having folded the envelope sheet to form the sides 1, 2 and 3, as just mentioned, strips 5 and 6 are interposed between the sides 1 and 3 adjacent the marginal end edges thereof, as best illustrated in Figures 1 and 7. These strips 5 and 6 may be made of wood or some other suitable substantially rigid material, and the sides 1, 2 and 3 are preferably adhesively fixed thereto to unite these parts together in the form illustrated in the drawings, the strips 5 and 6 serving to stiffen the ends of the casing A and provide lateral extensions at opposite sides of the shutter C which are adapted to coact with suitable abutments on the camera and developer to prevent movement of the outer casing A and the light-sensitive element mounted therein when the shutter is withdrawn, as will more fully appear hereinafter. The opposite ends of the casing are preferably bound by means of binding tape, as best illustrated in Figures 1 and 7, the binding tape being adhesively applied to the casing so as to extend along the sides, as at 7, and the tape preferably extending a short distance over the upper and lower sides 3 and 1, as at 8 and 9. The binding tape is also preferably extended around the opposite rear corners of the casing, as at 10. Such a construction is both simple and inexpensive, and affords an outer envelope which will not readily pull apart during use or handling. The lower side 1 of the envelope is preferably provided with one or more recesses 11, for purposes which will hereinafter appear.

It is to be understood that I do not wish to be limited to the details of construction just described, as the casing or envelope A may be modified in many respects as will be obvious to those skilled in the art. The important feature of the outer casing A resides in its envelope-like construction, open only along its front edge to receive the light-sensitive element and the shutter, and having an opening in one side thereof through which the light-sensitive element may be exposed when the shutter is withdrawn.

*Carrier*

The light-sensitive element may be mounted in the outer envelope or casing A in any convenient manner, but I prefer to effect this mounting by means of a carrier B, best shown in Figure 3.

The carrier is preferably composed of a single sheet of material, such as the black paper above referred to, which is reversely folded to provide an upper leaf 12, an intermediate leaf 13 and a bottom leaf 14. The upper leaf 12 is provided with an opening 15 therein of a size substantially the same as, or just slightly smaller than, the opening 4 in the upper side of the outer envelope A, with which the opening 15 is adapted to register when the carrier B is mounted in the envelope. The film, plate, or other light-sensitive element 16 is mounted on the upper surface of the intermediate leaf 13 of the carrier, as by adhesively affixing the same to this surface. The light-sensitive element may be of any desired type commonly employed for photographic work, but preferably of the type commercially known as "Positype" paper, which has a light-sensitive surface on which the image of the subject may be recorded when exposed thereto, and which may be developed by treatment of the same so that the final picture can be produced without the use of negatives. However, it is to be understood that other types of light-sensitive elements may be employed if desired.

The carrier B, with the light-sensitive element mounted therein so as to be virtually framed by the frame-like leaf 12, is folded substantially flat and inserted within the outer envelope or casing A, as best shown in Figures 1 and 7, the insertion being made through the open side 17 of the envelope A. When so inserted into the envelope, the bottom leaf 14 may be secured to the bottom side 1 of the envelope A or casing, as at 18, by means of a little spot of glue, or in some other convenient manner. In fixing the carrier B within the casing A, I preferably accomplish the same in such a way that the attachment of these parts may be broken or stripped, for the purpose of permitting removal of the carrier B and the picture from the casing after the completion of the picture. The recesses 11 permit the ready insertion of a thin instrument, such as a knife blade, between the bottom leaf 14 of the carrier B and the bottom 1 of the outer casing A, thereby facilitating the stripping of the carrier B and its removal from the casing A. Thus, the picture may be removed from the carrier and mounted in an album or otherwise utilized, as desired, and the carirer B may be discarded or used again for another light-sensitive element. On the other hand, the picture may be left mounted on the carrier when removed from the casing A following the developing of the picture, and the carrier or a part thereof utilized as a backer or frame for the picture.

When the carrier B, with the light-sensitive element 16, has been mounted in the envelope or casing A, its position will be substantially as shown in Figures 1 and 7, and the light-sensitive side of the element 16 registers with the openings 15 and 4 in the carrier and casing respectively. To control the exposure of the element 16, I provide a shutter or slide which will now be described.

Shutter or slide

The construction of the shutter or slide C may be best seen in Figures 2 and 4. It preferably comprises a sheet of black paper, similar to that employed for the carrier B and the casing A, the sheet being folded reversely, as in the construction of the carrier B, but oppositely to the direction of the folding of the carrier B. There is thus afforded in the shutter or slide an upper leaf 19, an intermediate leaf 20 and a lower leaf 21. The lower leaf 21 and intermediate leaf 20 are preferably bound at their opposite ends by means of binding tape 22, in a manner generally similar to the binding of the ends of the envelope or casing A, the tape being extended somewhat beyond the corners and over the folded side of these leaves, as at 23. By reason of this construction, there is thus provided an envelope completely closed on all sides excepting for the rearwardly opening mouth 24.

The upper leaf 19 of the shutter or slide C has secured thereto, as by glue or the like, a piece of thin cardboard 25, or some other relatively stiff material, and this cardboard is provided adjacent its forward marginal edge with a pair of L-shaped slots or recesses 26 which are adapted to receive therein the ends of a staple or loop-shaped tongue or tab 27, the ends of which are bent in a shape corresponding to the shape of the slots 26. This loop or staple 27 may be formed from relatively stiff wire, and when the ends of the same are received within the slots 26, the leaf 19 and its stiffening layer of cardboard 25 are folded down flat onto the intermediate leaf 20 and affixed thereto, as by means of glue or some other adhesive material, as best shown in Figure 2 which illustrates the completely assembled form of the shutter or slide C. The loop-shaped tongue or tab 27 affords a convenient means for manipulating the shutter to and fro across the face of the light-sensitive element 16. I preferably provide suitable mechanical instrumentalities on the camera and the developer apparatus for actuating the shutter, while the light-sensitive element is enclosed within a light-tight chamber formed by the camera or the developer apparatus, as the case may be.

Assuming that the shutter or slide C is in its final or complete form, as illustrated in Figure 2, the same may be inserted into the casing or envelope A, through the open side 17 of the latter, the shutter being slightly narrower in width than the casing A. As the shutter is so inserted, the folded edge 28 formed by the leaves 12 and 13 of carrier B is received within the mouth 24 of the pocket in the shutter or slide C. It is to be understood that when the carrier B is mounted in the envelope A, the folded edge 28 is disposed towards the front or open side of the latter, and as this edge is more or less rounded, it is readily received within the pocket in the shutter C. It will be observed that there are no abrupt edges or corners in any part of the pack unit which may interfere with the free movement of the shutter. The opposite ends 29 and 30 of the carrier B, as illustrated in Figure 7, terminate in slightly spaced relation from the strips 5 and 6, so as to enable the envelope-like shutter C to be inserted into the casing A and receive the leaves 12 and 13 of the carrier B and the light-sensitive element 16, within the pocket of the shutter.

It should be clear from the foregoing description that the shutter C constitutes an envelope for receiving the leaves 12 and 13 of the carrier B, along with the light-sensitive element 16 which is disposed between these leaves. In the finally assembled condition of the shutter C, the leaves 19 and 20, and the intermediate piece of cardboard 25, are united together and may be considered as a single element forming the top side of the shutter envelope, the bottom leaf 21 forming the bottom side of the envelope or pocket. However, it is to be understood that I do not wish to be limited to the precise details of the shutter construction as just described, inasmuch as the construction may be varied without departing from the spirit of the invention, although I prefer to employ a shutter of the general form of an envelope owing to the exceptionally high efficiency of such a construction in excluding light, while being comparatively simple and inexpensive.

In assembling the pack unit, the assembling operations are carried out in such a manner that the light-sensitive element 16 is not exposed to light. Thus, when the shutter C has been fully inserted into the casing A in masking relation to the element 16, all light is precluded from entering the pack, and the same can be handled in daylight as desired, without exposing the light-sensitive element until the pack has been loaded into a camera or other photographic apparatus, following which loading, the shutter or slide C may be withdrawn sufficiently far from the casing A to condition the pack for exposure of the light-sensitive element 16 under the control of the camera shutter.

As illustrated in Figure 6, the casing A is preferably provided with a strip of rubber, cotton cord, or other yieldable material 31, extending across the inner rear side thereof adjacent the upper corner so as to prevent movement of the light-sensitive element 16 upwardly in the casing A when the shutter C is withdrawn to expose element 16. This precaution is very important, particularly when the pack is in the camera, as any movement of the element 16 towards or away from the opening 4 would throw the element 16 out of focus respecting the camera lens. As best seen in Figure 6, the strip 31 lies above the rear portion of the carrier B and maintains the carrier in its normally folded flat condition even though the shutter C is withdrawn to expose element 16. This strip 31 may be adhesively applied within the casing A to maintain the same in the position illustrated.

It will be clear, particularly from reference to Figure 6, that there is no possibility whatsoever of light gaining access to the light-sensitive element 16 at the front of the casing or holder, by reason of the disposition of the element 16 within the envelope or pocket of the shutter when the shutter is moved inwardly into the casing A so as to completely mask the element 16. The binding tape 22 and 23 at opposite sides of the shutter, together with the front wall 32 of the shutter, effectively seal the shutter envelope or pocket against the entrance of light at the front end and sides of the pack. The closed rear end and sides of the casing A prevent light from entering the pack at the rear, and hence the element 16 is effectively guarded against exposure to light as long as the shutter is fully inserted within the outer casing.

Shutter actuating means

Suitable actuating means for the shutter is preferably provided on both the camera as well as the developing apparatus for imparting rectilinear or reciprocating motion to the shutter C.

In my co-pending application hereinbefore referred to, I have disclosed one example of suitable and inexpensive mechanism for actuating the shutter, as particularly illustrated herein in Figure 9. As shown, the actuating mechanism comprises a planetary gear wheel 40 which is rotatably mounted, as at 39, on a rotatable disc 38. The gear wheel 40 is adapted to mesh with a series of relatively fixed studs or pins 41, which are arranged in circumferentially spaced relation about the axis of disc 38. One of the teeth of the gear wheel 40 is provided with a pin 42 adapted to engage in the tab or staple 27 on the front edge of the shutter C. The teeth of the gear wheel 40 and the fixed gear studs or pins 41 are arranged in such relation that when the disc 38 is rotated one-half revolution, the pin 42 on the gear wheel 40 will be moved rectilinearly and diametrically across the disc 38, thus constituting one means for converting the rotary motion of the disc 38 into a rectilinear motion of the pin 42 and shutter C connected thereto. As shown, the disc or plate 40 will be carried to the dotted line position upon completion of a half revolution of the disc, and hence the shutter C will be drawn outwardly from the casing A through the rectilinear motion of the pin 42 with which the staple 27 is engaged. By reversing the rotation of the disc 38, the pin 42 is caused to move rectilinearly in an opposite direction, and thus push the shutter C into the casing A, so as to return it to its normally masking position respecting the light-sensitive element 16. So as to facilitate the return of the shutter C to its masking position, the shutter is preferably not fully withdrawn from the casing A when the pack is in the camera, but is preferably moved outwardly only far enough to uncover the light-sensitive element 16 when the shutter is withdrawn to expose the element 16 for taking a picture, inasmuch as the shutter is preferably returned to its masking position relatively to the element 16 after exposure of element 16 so as to permit removal of the pack from the camera and transfer of the pack to the developer apparatus without spoiling the image recorded on the element 16, even though this transfer be effected in daylight.

As previously mentioned, the shutter actuating mechanism just described, or its equivalent, is provided both in the camera as well as in the developing apparatus, and also both the camera and the developing apparatus are preferably provided with a frame or holder, generally designated 50, for receiving the pack unit. To prevent the casing A and the carrier B from moving along with the shutter C during movement of the latter by the actuating mechanism just described, the frame 50 is preferably provided with abutments or stop shoulders 51 adapted to engage in front of the opposite ends of the casing A, that is, at opposite sides of the shutter. Strips 5 and 6 form lateral extensions at the opposite ends of the casing A so as to provide surfaces of sufficient width and rigidity to constitute abutment shoulders on the casing which may engage with the shoulders 51 on the frame 50. If desired, some other convenient means may be employed to hold the pack unit against movement during movement of the shutter. The glue applied at 18 prevents the carrier B from being withdrawn from the casing A when the shutter C is withdrawn.

When the shutter has been opened during the developing of the picture in the developing apparatus, I preferably provide suitable means, not shown, for pressing the upper face 3 of the casing A towards the lower face 1, or vice versa, whereby to yieldably clamp the light-sensitive element 16 tightly within the casing, the clamping action being exerted about the margins of the pack. Thus the element 16 is firmly held in position during the exposure of the same to the developing fluid, during development of the picture. This clamping action is particularly important in the developing operation by means of my developer apparatus disclosed in my aforesaid co-pending application, bearing in mind that it is desired to confine the developing and other treating liquids to the upper face of the light-sensitive element, that is, the light-sensitive side, and prevent leakage of the fluid around the sides of the pack. The pack being made of pliable or flexible material, such as paper, it readily lends itself to this pinching or compressing action, above referred to, to tightly seat the pack within the frame of the developer apparatus, and becomes self-sealing, so to speak. For a more clear understanding of the yieldable clamping means, reference may be had to my co-opending application.

Although the pack herein described is especially applicable for use in a daylight developer having the particular form disclosed in my co-pending application, it is to be understood that the developing of the element 16 may be carried out in any other manner such as is commonly practiced, if desired. Moreover, such a pack has many advantages in its use in cameras which may be readily equipped to receive the same. The mechanical instrumentalities for actuating the shutter are quite simple and inexpensive in construction, and it is to be understood that the camera and developer are preferably each provided with the same type of shutter actuating means so as to permit the shutter to be controlled in the camera as well as in the developer.

It has been my aim in devising the pack disclosed herein and the developer of my co-pending application, to promote interest in photography, by providing relatively inexpensive photographic equipment which enables the user to take pictures and develop the same without the aid of special expert developing service, and without necessitating the taking of a whole series of pictures before the developing of a particular picture can be effected. Thus the invention should appeal to amateurs, and especially to young people.

While the specific details of the invention have been herein shown and described, the invention is not confined thereto as changes and alterations may be made without departing from the spirit thereof, as defined by the appended claims.

What I claim as new and desire to secure by Letters Patent, is—

1. A photographic pack comprising an envelope having an opening in one side, means for supporting a light-sensitive element within the envelope across said opening whereby the same may be exposed therethrough, a shutter slidable within said envelope to and from a position across the opening and light-sensitive element, in combination with mechanical means for opening and closing the shutter, said mechanical means including a relatively stiff member fixedly secured to said shutter and projecting beyond one edge thereof.

2. A photographic pack comprising an envelope open along one edge for receiving a shutter and having an opening in one side, a light-sensitive element supported within the envelope across said opening, a shutter slidable in the open edge of said envelope to and from a position across the side opening and light-sensitive element, in combination with mechanical means for operating the shutter, said mechanical means including an open loop member extending from the forward edge of said shutter.

3. A photographic pack comprising an outer envelope open along one edge and having the remaining edges and one side closed and its opposite side provided with an opening, a carrier mounted within the envelope and adapted to support a light-sensitive element across the opening in the side of the envelope, and shutter means slidable in the open edge of the outer envelope to and from a position across the opening in the side of the latter whereby to mask or expose the light-sensitive element at will, said shutter means comprising an inner envelope adapted to receive the light-sensitive element therein, said inner envelope being open along one edge and having the remaining edges and sides closed.

4. A photographic pack comprising an envelope open along one edge for receiving a shutter and having an opening in one side, a carrier mounted within the envelope and adapted to support a light-sensitive element across the opening in the side of the envelope, a shutter slidable in the open edge of the envelope to and from a position across the opening in the side thereof and across the light-sensitive element, and means within the envelope adapted to engage the rear edge of the carrier to prevent movement of the light-sensitive element towards the opening in the side of the envelope when the shutter is slidably withdrawn from the envelope to a position exposing the light-sensitive element.

5. A holder for photosensitized elements and the like, comprising a supporting member formed of flexible opaque material folded upon itself and on one leaf of which the light-sensitive element is adapted to be mounted, and a shutter member also formed of flexible opaque material folded upon itself, the folds of said shutter and supporting member being oppositely disposed, and certain of the leaves of the supporting member and the shutter being respectively received within a fold of the other member, said supporting member and shutter member being slidably movable relatively to each other to expose or mask the light-sensitive element at will.

6. A holder for photosensitized elements and the like, comprising a carrier formed of opaque material folded upon itself in respectively opposite directions to provide upper and lower leaves and an intermediate backing leaf on which the light-sensitive element is adapted to be mounted, and a shutter also formed of opaque material and folded upon itself in respectively opposite directions complementary to said carrier, one leaf of said shutter being adapted to be received between the lower and intermediate leaves of the carrier, and the upper and intermediate leaves of said carrier being adapted to be received within the fold formed by the shutter leaf which is received by the carrier and the intermediate shutter leaf.

7. A photographic pack comprising an outer envelope open along one edge and having the remaining edges and the lower side closed and its upper side provided with an opening, a carrier adapted to be slidably received within the outer envelope, said carrier being formed of flexible opaque material folded upon itself in respectively opposite directions to provide upper and lower leaves and an intermediate leaf, the upper leaf being provided with an opening corresponding to the opening in the upper side of the outer envelope, the lower leaf of said carrier being detachably secured to the lower side of said outer envelope with the folded edge of the upper and intermediate leaves of the carrier disposed adjacent the opening in the edge of the outer envelope, a light-sensitive element mounted intermediate the upper and intermediate leaves of the carrier with its light-sensitive surface registering with the opening in the upper leaf of the carrier and with the opening in the upper side of the outer envelope, and a shutter slidable within the outer envelope, said shutter comprising an inner envelope open along one edge and having the remaining edges and sides closed, the open edge of the shutter being adapted to receive the folded edge of the upper and intermediate leaves of the carrier whereby the inner envelope may be moved into the outer envelope with the upper and intermediate leaves of the carrier and the light-sensitive element carried by the carrier received within the inner envelope, and when so received, to mask the light-sensitive element.

8. A photographic pack as claimed in claim 7, wherein the shutter is formed of flexible opaque material folded upon itself in respectively opposite directions to provide upper and lower leaves and an intermediate leaf, the lower and intermediate leaves being bound together along their opposite edges whereby to form a rearwardly opening pocket into which the upper and intermediate leaves of the carrier, and the light-sensitive element are adapted to be received when the shutter is moved into the outer envelope, and said shutter also including a stiffening member interposed between the intermediate and upper leaves of the shutter, said upper leaf, intermediate leaf and stiffening member being united together and forming the upper side of the shutter pocket or envelope.

9. A photographic pack as claimed in claim 7, wherein the shutter is formed of flexible opaque material folded upon itself in respectively opposite directions to provide upper and lower leaves and an intermediate leaf, the lower and intermediate leaves being bound together along their opposite edges whereby to form a rearwardly opening pocket into which the upper and intermediate leaves of the carrier, and the light-sensitive element, are adapted to be received when the shutter is moved into the outer envelope, said shutter also including a stiffening member interposed between the intermediate and upper leaves of the shutter, said upper leaf, intermediate leaf and stiffening member being united together and forming the upper side of the shutter pocket or envelope, said stiffening member having angularly shaped slots in the forward portion thereof, and a staple having its ends bent to conform to the aforementioned angular slots, and received within the slots whereby to anchor the staple to the shutter, said staple serving as a means for actuating said shutter.

10. A photographic pack comprising an envelope open along one edge for receiving a shutter and having an opening in one side, a light-sensitive element supported within the envelope across said opening, a shutter slidable in the open edge of said envelope to and from a position across the side opening and light-sensitive element, in combination with mechanical means for operating said shutter, said mechanical means including an open loop member extending from the forward edge of said shutter, and mechanical instrumentalities operatively engageable with the loop member for imparting movement to said shutter.

11. A photographic pack comprising an outer casing having an opening in one edge and having an opening in one side across which latter opening a light-sensitive element is adapted to be positioned within the casing, and a shutter slidable within the casing through the opening in its edge to and from a position across the second mentioned opening whereby to respectively close and open the latter opening, said shutter comprising a flexible sheet of opaque material folded upon itself in such manner as to provide a plurality of juxtaposed leaves, said leaves being bound together in the form of a pocket having an opening at one edge adapted to receive the light-sensitive element therein, and one side of said pocket being composed of two contiguous leaves folded one upon the other along a line at the mouth of said pocket.

12. A photographic pack comprising an outer casing having an opening in one edge and having an opening in one side across which latter opening a light-sensitive element is adapted to be positioned within the casing, a shutter slidable within said casing through the opening in its edge to and from a position across the second mentioned opening whereby to respectively close and open said latter opening, and certain parts of said pack being laterally extended beyond the ends of said shutter and forming abutment means adapted to coact with means in a camera and/or developer apparatus whereby to prevent movement of the outer casing and light-sensitive element during movement of the shutter.

13. A photographic pack comprising an outer casing having an opening in one edge and having an opening in one side across which latter opening a light-sensitive element is adapted to be positioned within the casing, a shutter slidable within said casing through the opening in its edge to and from a position across the second mentioned opening whereby to respectively close and open said latter opening, and said outer casing having abutment means extending laterally therefrom at opposite sides of the shutter and adapted to coact with abutment means in a camera and/or developer apparatus whereby to prevent movement of the outer casing during movement of the shutter.

14. A photographic pack comprising a casing, a light-sensitive element mounted therein and fixedly secured thereto in such a temporary manner as to be capable of being stripped therefrom, said casing having an opening therein through which the light-sensitive element may be exposed, and a shutter movable to and from a position across said opening whereby to respectively close and open the same.

15. A photographic pack comprising an outer casing having an opening in one edge and having an opening in one side, across which latter opening a light-sensitive element is adapted to be positioned within the casing, and a shutter slidable within the casing through the opening in its edge, to and from a position across the second mentioned opening whereby to respectively close and open the latter opening, said shutter comprising a flexible sheet of opaque material folded upon itself in such manner as to provide a plurality of juxtaposed leaves, said leaves being secured together in the form of a pocket having an opening at one edge adapted to receive the light-sensitive element therein, and one side of said pocket being composed of two contiguous leaves.

16. A photographic pack comprising an outer casing having an opening in one edge and having an opening in one side, across which latter opening a light-sensitive element is adapted to be positioned within the casing, and a shutter slidable within the casing through the opening in its edge, to and from a position across the second mentioned opening whereby to respectively close and open the latter opening, said shutter comprising a flexible sheet of opaque material folded upon itself in such manner as to provide a plurality of juxtaposed leaves, said leaves being secured together in the form of a pocket having an opening at one edge adapted to receive the light-sensitive element therein, and one side of said pocket being composed of two contiguous leaves, with a stiffener member interposed therebetween.

17. A photographic pack comprising an outer casing having an opening in one edge and having an opening in one side, across which latter opening a light-sensitive element is adapted to be positioned within the casing, a shutter slidable within the casing through the opening in its edge to and from a position across the second mentioned opening, whereby to respectively close and open the latter opening, said shutter comprising a single flexible sheet of opaque material folded upon itself to provide a plurality of leaves, certain of said leaves being folded over upon another leaf and bound thereto along certain of the free marginal edges thereof to provide a pocket or envelope having its edges, with the exception of one edge, closed, and at least one side closed, whereby to enable the last mentioned side of the shutter to completely mask the light-sensitive element when the shutter is moved into the casing with the last mentioned side disposed next to the side of the casing having the opening therein, and with the light sensitive element received within the pocket of the shutter.

18. A holder for photo-sensitized elements and the like, comprising a supporting member formed of flexible opaque material folded upon itself and on one leaf of which the photo-sensitized element is adapted to be mounted, and a shutter member also formed of flexible opaque material folded upon itself so as to form a pocket into which certain of the leaves of the supporting member, and the photo-sensitized element, are adapted to be received, the folds of said shutter being so arranged and the leaves secured together in such manner as to provide the pocket with three closed edges and one open edge, through which latter edge the supporting member and photo-sensitized element may be received into the pocket pursuant to sliding movement of the supporting member and shutter relatively to each other.

HERMAN CASLER.